United States Patent [19]
Nishino

[11] Patent Number: 4,738,427
[45] Date of Patent: Apr. 19, 1988

[54] HEIGHT ADJUSTING DEVICE FOR AN AUTOMOTIVE SEAT

[75] Inventor: Takaichi Nishino, Akishima, Japan

[73] Assignee: Tachi-S Co. Ltd, Japan

[21] Appl. No.: 927,352

[22] Filed: Nov. 4, 1986

[51] Int. Cl.⁴ ............................................. F16M 13/00
[52] U.S. Cl. ..................................... 248/421; 248/422
[58] Field of Search ............... 248/396, 394, 395, 421, 248/422, 397, 419; 297/313

[56] References Cited

U.S. PATENT DOCUMENTS

| | | | |
|---|---|---|---|
| 7,224 | 3/1890 | Searele | 248/396 |
| 2,930,428 | 3/1960 | De Rose | 248/394 |
| 4,406,497 | 9/1983 | Kluting | 248/396 |
| 4,533,027 | 8/1985 | Otani | 248/394 |
| 4,556,185 | 12/1985 | Takagi | 248/421 |

FOREIGN PATENT DOCUMENTS 1191256 4/1965 Fed. Rep. of Germany ........ 16/354

Primary Examiner—Reinaldo P. Machado
Assistant Examiner—Alvin Chin-Shue
Attorney, Agent, or Firm—Oldham, Oldham & Weber Co.

[57] ABSTRACT

A height adjusting device is disclosed which adjusts the height of a seat cushion of an automotive seat in the vertical direction. In the height adjusting device, a seat cushion frame is mounted to one end of a bell crank rotatably supported by an upper rail of a seat adjuster, a connecting rod is connected to the other end of the bell crank, there is formed in the free end portion of the connecting rod a rack portion intermeshable with a pinion gear cooperatively connected with an operation knob, and the rack portion is grasped by and between the pinion gear and a rotary roller mounted to the upper rail.

6 Claims, 3 Drawing Sheets

U.S. Patent   Apr. 19, 1988   Sheet 3 of 3   4,738,427
FIG.4
FIG.5
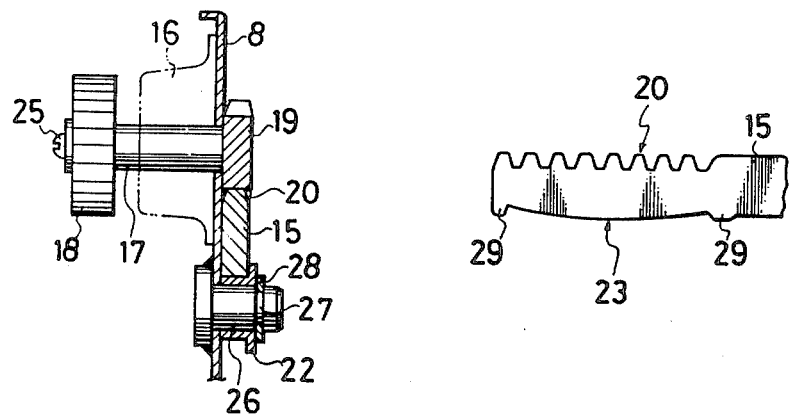
FIG.6
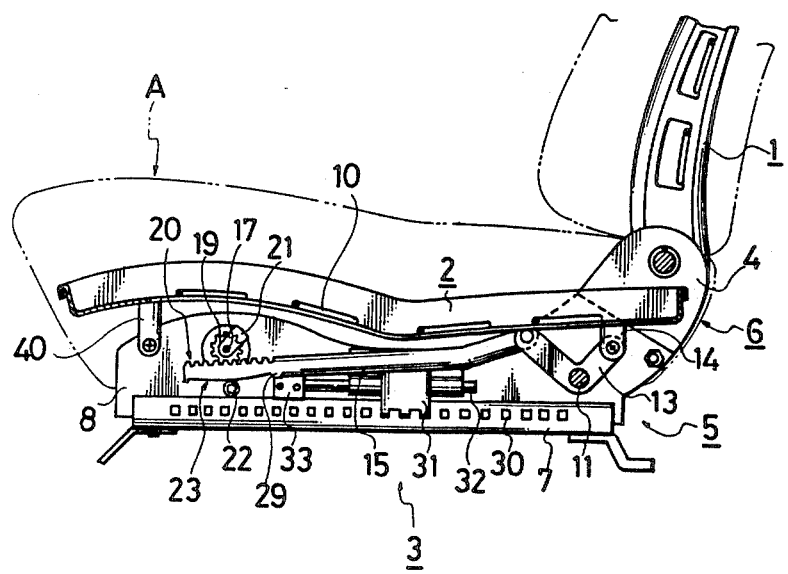

HEIGHT ADJUSTING DEVICE FOR AN AUTOMOTIVE SEAT

BACKGROUND OF THE INVENTION

1. Field of the Invention

The present invention relates to a seat height adjusting device and, in particular, to a device for adjusting the heights of the front and rear portions of a seat cushion of an automotive seat independent of each other or adjusting only the height of the rear portion of the seat cushion.

2. Description of the Prior Art

In a conventional height adjusting device adapted to raise or lower the rear portion of a seat cushion, as shown in FIG. 1, a bell crank (102) supporting the rear portion of a seat cushion frame (101) is connected to an operation knob (103) disposed in the front portion of a seat by means of a link (104) and the front portion of the seat cushion frame (101) is slidably mounted to an upper rail (111) of a seat adjuster (110) via a bracket (112), whereby the rear portion of the seat cushion frame (101) can be moved up or down by rotating the operation knob (103) located in the front portion of the seat. In other words, the rotational movements of the operation knob (103) are converted into horizontal linear displacements by a sector gear (106) intermeshing with a pinion gear (105) which is fixed to a co-axial shaft (107) of the operation knob (103), and then the horizontal linear displacements are converted into vertical linear displacements by means of the bell crank (102), so that the rear portion of the seat cushion frame (101) can be raised or lowered. Also, a shaft (108) for supporting the fan-shaped sector (106) in a fixed manner as well as a crankshaft (109) for supporting the bell crank (102) in a fixed manner are provided so as to extend across the right and left upper rails (111) of the seat adjuster (110).

However, in such a driving system as employs this type of sector gear (106), the sector gear (106) is brought into contact with the femoral region to the bottom of an occupant, which impairs the sitting feeling of the occupant and also may cut or damage a pad. Also, since the driving system is complicated in structure, it is difficult to assemble and may produce loose conditions.

SUMMARY OF THE INVENTION

The present invention aims at eliminating the drawbacks found in the above-mentioned prior art seat height adjusting device.

Accordingly, it is an object of the invention to provide a seat height adjusting device which provides a comfortable sitting feeling and is simple in structure.

In attaining the above object, according to the invention, there is provided a height adjusting device in which a seat cushion frame is mounted to one end of a bell crank rotatably supported by two upper rails of a seat adjuster, a connecting rod is connected to the other end of the bell crank, there is formed on the free end side of the connecting rod a rack portion which is engageable with a pinion gear cooperatively connected with an operation knob, and the rack portion is grasped and restricted by a rotary roller mounted to the above-mentioned upper rail and the the above-mentioned pinion gear. In other words, since there is eliminated the need for use of a fan-shaped sector gear and its associated parts as in the above-mentioned conventional adjusting device, the invention can get over the drawbacks found in the conventional height adjusting device.

BRIEF DESCRIPTION OF THE DRAWINGS

The above and other objects, features, and advantages of the present invention will be more fully apparent to those of ordinary skill in the art to which this invention pertains from the following detailed description, when considered in connection with the accompanying drawings, in which like reference characters designate like or corresponding parts throughout the several view, and wherein:

FIG. 4 is an enlarged, longitudinal section view to show a state in which a connecting rod is engaged with a driving pinion gear;

FIG. 5 is a side view to show a portion adjacent to the free end of the connecting rod; and, FIG. 6 is a central, longitudinal section view of the automotive seat, illustrating a portion of thereof in which the height adjusting device of the invention is disposed.

DETAILED DESCRIPTION OF A PREFERRED EMBODIMENT OF THE INVENTION

Figure 2:
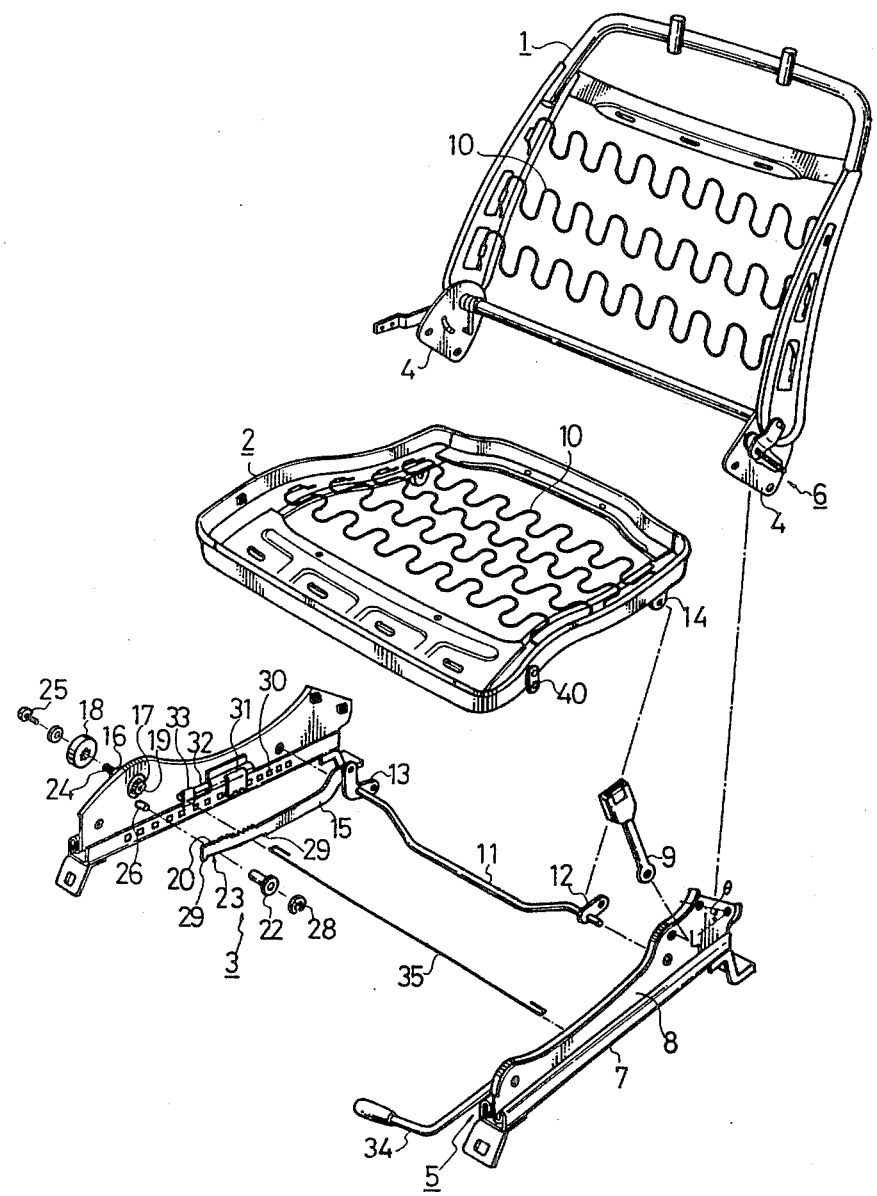
FIG. 2 is an exploded, perspective view of an automotive seat which incorporates an embodiment of a height adjusting device constructed in accordance with the present invention.

Referring first to FIG. 2, there is shown an exploded perspective view of a seat frame of an automotive seat which incorporates a height adjusting device constructed in accordance with the present invention. The seat frame is mainly composed of a seat back frame (1), a seat cushion frame (2), a height adjusting device (3) supporting the front and rear portions of the seat cushion frame (2) and mounted to a seat adjuster (5) in a vertically movable manner, the seat adjuster (5) supporting the whole seat in such a manner that the seat can be adjusted in position in the forward and rearward direction thereof (that is, in a direction of advancement of an automobile in which the seat is employed), and a reclining device (6) which connects the above-mentioned seat back frame (1) with the seat adjuster (5) so that the seat back frame (1) can be adjusted in angle. And, the seat frame can be installed to a body of the automobile by fixing the lower rails (7) (not shown) of the seat adjuster (5). Also, the seat adjuster (5) includes a pair of upper rails (8), to one of which is mounted a restricting member, or, a buckle (9) for fixing the free end of a seat belt (not shown) to the upper rail.

In the seat back frame (1) and the seat cushion frame (2), there are provided a plurality of S-shaped springs (10) so as to extend thereacross, and a cushion member formed of foam material is placed on these springs (10). Thus, when the seat back frame (1) or the seat cushion frame (2) is covered with a seat cover (not shown), then a seat back or a seat cushion (A) is obtained. As the seat back frame (1), any of conventional known frames can be employed provided that they are constructed so as to be provided with fitting portions or fitting members for mounting various kinds of equipment such as the height adjusting device (3) or the like. For example, in the illustrated embodiment, there is employed a frame having a spring structure in which S-springs are provided so as to extend across a composite structure composed of pipes and thin plates.

As the reclining device (6), there can be employed both of a reclining device of a fine adjustment type and a reclining device of an infinitely variable adjustment type. In the illustrative embodiment, the fine adjustment type of reclining device is employed and is mounted to the two sides of the seat back frame (1). Specifically, the reclining device (6) is mounted on the side of the seat back frame (1) and its lower brackets (4) are mounted to the upper rails (8) of the seat adjuster (5), respectively, so that the seat back frame (1) is connected with the seat cushion frame (2) by means of the reclining device (6).

Also, to the other upper rail (8) of the above-mentioned seat adjuster (5) which is located centrally of a room of the automobile, there is mounted a buckle (9) for restricting the free end, namely, the tongue (not shown) of the seat belt. The mounting position of the buckle (9) is defined in the range of 0°~50° with respect to a base line L which passes through the mounting position of a lower bracket (10) of the reclining device (6).

Figure 1:
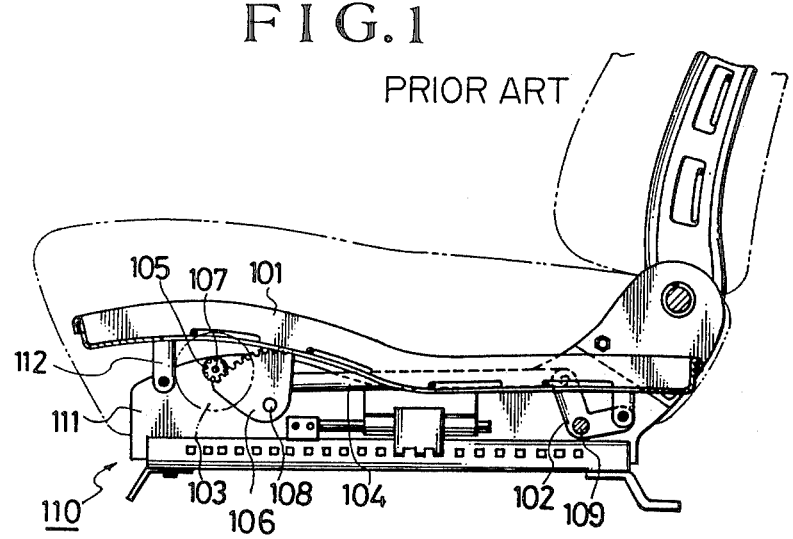
FIG. 1 is a central, longitudinal section view of an example of an automotive seat which incorporates a prior art height adjusting device.
Figure 3:
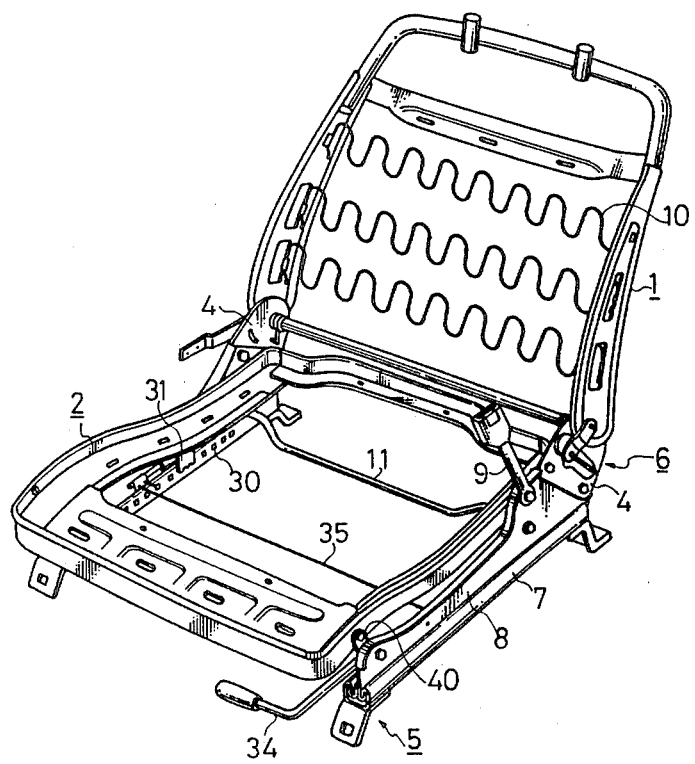
FIG. 3 is an assembled, perspective view of the automotive seat shown in FIG. 2.

Referring now to FIG. 3, there is illustrated the seat frame of the automotive seat after the height adjusting device is attached thereto.

The height adjusting device (3), which is adapted to raise or lower the rear portion of the seat cushion frame (2) in an independent manner, normally, comprises a working part which uses a rotary link mechanism to connect the seat cushion frame (2) to the upper rails (8) of the seat adjuster (5) in such a manner that the seat cushion frame (2) can be moved upwardly and downwardly, and an operation part for supplying the working portion with a driving rotational force.

The working part is arranged such that the respective first ends of a link (12) and a bell crank (13) are fixed to a crankshaft (11) rotatably journaled to the right and left upper rails (8) and the other ends thereof are rotatably connected to brackets (14) of the seat cushion frame (2), respectively, whereby the rear portion of the seat cushion frame (2) can be raised or lowered by means of rotation of the crankshaft (11). The rotation of the crankshaft (11) can be obtained by converting the rotational movements of the operation part into the linear displacements of a connecting rod (15) which is connected to the first end of the bell crank (13) fixed to the crankshaft (11).

In order to construct the operation part that gives driving forces to the above-mentioned working part, rotary shaft (17) incorporating therein well-known brake mechanism and device (16) is mounted to the upper rail (8) of the seat adjuster (5) and an operation knob (18) is attached to the rotary shaft (17). As an example of the above-mentioned well-known brake mechanisms, a coil spring can be used. The coil spring may be wound around the rotary shaft (17) and has an inside dimameter smaller than the outside diameter of the rotary shaft (17), while it has an end fixedly secured to the rotary shaft (17) and the other end fixed to a case fixedly connected to the upper rail (8). If the rotary shaft (17) is rotated in a direction opposite to the winding direction of the coil spring, then the inside diameter of the coil spring is caused to become greater than the outside diameter of the rotary shaft (17) to remove the binding condition of the coil spring relative to the rotary shaft (17), so that the rotary shaft (17) can be rotated easily.

The rotary shaft (17) can be engaged via a pinion gear with a rack portion (20) formed in the front end portion of a connecting rod (15) to drive the working part of the height adjusting device (3), thereby moving the rear portion of the seat cushion frame (2) upwardly or downwardly. To the pinion gear (19), there is mounted a locking plate (21) which is rotatable together with the pinion gear (19) for engagement with the rack portion (20) of the connecting rod (15) and thus able to limit the range of rotation of the pinion gear (19). That is, there is eliminated the possibility that the pinion gear (19) may be disengaged out of the rack portion (20) in the connecting rod (15) during operation. The rack portion (20) in the front end portion of the connecting rod (15) is placed on roller (22) with a flange rotatably mounted to the upper rail (8) while the top portion of the rack portion (20) is pressed by the pinion gear (19) of the rotary shaft (17), that is, the rack portion (20) is firmly held by and between the roller (22) and the pinion gear (19), (FIG. 4).

Also, the lower side (23) of the connecting rod (15) to be in contact with the roller (22), as shown in FIG. 5, is formed in a curved shape so that the inclination of the connecting rod (15) can be freely changed correspondingly to the vertical displacements of the rear portion of the connecting rod (15).

The rotary shaft (17) is arranged such that it can not be rotated by loads applied from the side of the connecting rod (15) by the well-known brake device (16). Also, the rotary shaft (17) is provided in the front end portion thereof with a serrated groove (24), into which an operation knob (18) is fitted and the operation knob (18) is fixed by a screw (25).

The roller (22) suppporting the free end portion, that is, the rack portion (20) of the connecting rod (15), as shown in FIG. 4, is inserted into a pin (26) welded to the upper rail (8), with a snap ring (28) being inserted into a groove (27), so that the roller (22) is rotatably attached to the upper rail. Also, as shown in FIG. 5, the lower curved surface (23) formed below the rack portion (20) in the connecting rod (15) is provided at the two ends thereof with step portions (29)(29) to serve as stoppers, so that there is eliminated the possibility that the connecting rod (15) may be slipped off from between the pinion gear (19) and the roller (22).

In FIG. 6, reference character (40) designates a bracket which is fixed to the seat cushion frame (2). The lower end of the bracket (40) is rotatably mounted to the upper portion of the upper rail (8).

Now, although in the illustrated embodiment of the invention the description has been given of the height adjusting device adapted to raise or lower the rear portion of the seat cushion (A), it should be naturally understood that the principles of the invention can also apply to a height adjusting device of a type that can move upwardly and downwardly the front and rear portions of a seat cushion independent of each other.

As the seat adjuster (5), there is employed a seat adjuster of a well-known structure which comprises the upper rails (8) for supporting the seat frames (1),(2) and the lower rails (7) mounted to the body of the automobile and supporting the upper rails (8) in a slidable manner. The seat adjuster (5) includes a stopper mechanism in which there is rotatably mounted to the side of the upper rail (8) an engagement claw (31) engageable into a plurality of stopper holes (30) formed in the lower rail (7) at given intervals, and a link plate (33) fixed to the rotational shaft (32) of the engagement claw (31) is connected to an operation lever (34) by means of a wire (35), whereby the operation lever (34) is lifted up and rotated to rotate the engagement claw (31) so as to be able to remove the engagement claw (31) from the stopper holes (30).

As the present invention is constructed in the above-mentioned manner, when the operation knob (18) is rotated, then the rotary shaft (17) is rotated, which in turn causes the pinion gear (19) to rotate. The rotational movements of the pinion gear (19) push and pull the connecting rod (15) horizontally to rotate the bell crank (13) as well as to rotate the link (12) through the crankshaft (11) so as to move the seat cushion frame (2) upwardly and downwardly, with the result that the height of the rear portion of the seat cushion (A) can be adjusted.

In conclusion, the height adjusting device for an automotive seat according to the invention has the following advantages:

(1) When compared with the conventional height adjusting devices, the invention can reduce costs due to elimination of the sector gear and its associated parts, can reduce the possibility of generation of loose conditions due to reduction of the fulcra and rotary parts, and is easier to assemble.

(2) Since the height adjustment device according to the invention is constructed such that rotational movements can be converted into linear displacements by means of a combination of the pinion gear and rack means, unlike the conventional device employing a fan-shaped sector gear, there is eliminated the possibility that any unfavorable parts may be brought into contact with the body of the occupant to impair the sitting feeling of the occupant or may give damage to a pad. Thus, the present height adjusting device can be applied to a thin automotive seat as well.

What is claimed is:

1. A height adjusting device for use in an automotive seat comprising:
   a bell crank for connecting right and left upper rails of a seat adjuster with a seat cushion frame;
   a crankshaft rotatably supported by and between the rear portions of said right and left upper rails of said seat adjuster, said bell crank being fixed to one end portion of said crankshaft, one end of said bell crank being connected to said seat cushion frame, the front portions of said right and left upper rails being connected with said seat cushion frame by means of brackets, respectively;
   a link having one end fixed to the other end of said crankshaft, and the other end of said link being connected to said seat cushion frame;
   a connecting rod being connected with said bell crank and having a rack portion;
   a pinion gear intermeshable with said rack portion of said connecting rod, and means for restricting the range of rotation of said pinion gear;
   an operation lever fixed to a rotary shaft mounted to said upper rail of said seat adjuster and said pinion gear being fixed to a portion where said rotary shaft is located within said upper rails; and,
   a rotary roller mounted to said upper rail of said seat adjuster for supporting a free end portion of said connecting rod said rack portion is formed on a upper side of said free end portion, and said free end portion on a lower side thereof is provided with two step portions for serving as stoppers for said rotary roller in preventing said connecting rod from slipping off.

2. A height adjusting device for use in an automotive seat as defined in claim 1, wherein a seat back frame is mounted to said upper rails of said seat adjuster by means of a reclining device so as to act in concert with said seat adjuster for inclining said seat back frame forwardly and backwardly.

3. A height adjusting device for use in an automotive seat as defined in claim 1, wherein said means for restricting the range of rotation of said pinion gear comprises a locking plate which is rotatable with said pinion gear and engageth with said rack portion.

4. A height adjusting device for use in an automotive seat as defined in claim 1, wherein said rotary roller for supporting said free end portion of said connecting rod is located below said pinion gear, and said connecting rod is held between said rotary roller and said pinion gear.

5. A height adjusting device for use in an automotive seat as defined in claim 1, wherein said rotary roller is provided with an integral flange which prevents said connecting rod from slipping off out of position.

6. A height adjusting device for use in an automotive seat as defined in claim 1, wherein a lower side of said connecting rod free end portion is formed in a curved shape so that said connecting rod in communication with said rotary roller can be inclined correspondingly to the vertical displacements thereof.

* * * * *